US011069884B2

(12) United States Patent
Takanashi et al.

(10) Patent No.: US 11,069,884 B2
(45) Date of Patent: Jul. 20, 2021

(54) METHOD FOR PRODUCING POSITIVE ELECTRODE ACTIVE MATERIAL FOR NONAQUEOUS ELECTROLYTE SECONDARY BATTERIES, POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: SUMITOMO METAL MINING CO., LTD., Tokyo (JP)

(72) Inventors: Shoji Takanashi, Ichikawa (JP); Tetsufumi Komukai, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 420 days.

(21) Appl. No.: 14/914,188

(22) PCT Filed: May 29, 2014

(86) PCT No.: PCT/JP2014/064290
§ 371 (c)(1),
(2) Date: Feb. 24, 2016

(87) PCT Pub. No.: WO2015/029525
PCT Pub. Date: Mar. 5, 2015

(65) Prior Publication Data
US 2016/0204415 A1    Jul. 14, 2016

(30) Foreign Application Priority Data
Aug. 28, 2013 (JP) .............................. JP2013-176883

(51) Int. Cl.
*H01M 4/131* (2010.01)
*H01M 4/04* (2006.01)
(Continued)

(52) U.S. Cl.
CPC ............ *H01M 4/131* (2013.01); *C01G 53/42* (2013.01); *H01M 4/0402* (2013.01);
(Continued)

(58) Field of Classification Search
CPC ........ H01M 4/366; H01M 4/525; H01M 4/62; H01M 4/625; H01M 4/131; H01M 4/505;
(Continued)

(56) References Cited

U.S. PATENT DOCUMENTS 5,183,710 A    2/1993 Gerbino
5,358,801 A *  10/1994 Brodd .................. H01M 4/131
                                                429/214

(Continued)

FOREIGN PATENT DOCUMENTS

JP    2003-31222 A     1/2003
JP    2003-157836 A    5/2003
(Continued)

OTHER PUBLICATIONS

Machine Translation for JP 2011-070908 (cited on IDS). Apr. 7, 2011.*
(Continued)

*Primary Examiner* — Eugenia Wang
(74) *Attorney, Agent, or Firm* — Westerman, Hattori, Daniels & Adrian, LLP

(57) ABSTRACT

A method produces a positive electrode active material that does not impair the original battery characteristics of the positive electrode active material. The method can improves water resistance, and suppress the gelation of a positive electrode mixture material paste. The method for producing a positive electrode active material for nonaqueous electrolyte secondary batteries can include a mixing step of preparing a mixture including fine carbon particles, an organic dispersant, a hydrophobic coat forming agent, an organic (Continued)

2032-type coin battery solvent, and positive electrode active material particles, a drying step of drying the mixture to obtain the mixture containing the organic solvent in a reduced amount, and a heat treatment step of heat-treating the mixture containing the organic solvent in the reduced amount to obtain a coated positive electrode active material.

15 Claims, 1 Drawing Sheet

(51) Int. Cl.
$H01M\ 10/0525$ (2010.01)
$H01M\ 4/525$ (2010.01)
$H01M\ 4/505$ (2010.01)
$H01M\ 4/36$ (2006.01)
$H01M\ 4/62$ (2006.01)
$H01M\ 10/052$ (2010.01)
$H01M\ 4/1391$ (2010.01)
$H01M\ 4/587$ (2010.01)
$H01M\ 10/0585$ (2010.01)
$C01G\ 53/00$ (2006.01)
$H01M\ 4/02$ (2006.01)

(52) U.S. Cl.
CPC ........... $H01M\ 4/366$ (2013.01); $H01M\ 4/505$ (2013.01); $H01M\ 4/525$ (2013.01); $H01M\ 4/62$ (2013.01); $H01M\ 4/625$ (2013.01); $H01M\ 10/0525$ (2013.01); $H01M\ 10/0585$ (2013.01); $C01P\ 2006/12$ (2013.01); $C01P\ 2006/40$ (2013.01); $H01M\ 4/0471$ (2013.01); $H01M\ 4/1391$ (2013.01); $H01M\ 4/587$ (2013.01); $H01M\ 10/052$ (2013.01); $H01M\ 2004/028$ (2013.01)

(58) Field of Classification Search
CPC .. H01M 4/0402; H01M 4/425; H01M 4/0471; H01M 4/1391; H01M 10/0525; H01M 10/0585; H01M 10/052; H01M 2004/028
See application file for complete search history.

(56) References Cited

U.S. PATENT DOCUMENTS

| 6,245,832 | B1 | 6/2001 | Suzuki et al. | |
|---|---|---|---|---|
| 2002/0077412 | A1 | 6/2002 | Kobayashi et al. | |
| 2008/0118836 | A1* | 5/2008 | Hwang | H01M 4/587 429/219 |
| 2008/0233477 | A1* | 9/2008 | Takahashi | H01M 4/131 429/212 |
| 2009/0194747 | A1* | 8/2009 | Zou | H01M 4/131 252/519.33 |
| 2010/0140554 | A1* | 6/2010 | Oki | H01M 4/131 252/500 |
| 2010/0230641 | A1 | 9/2010 | Oki et al. | |
| 2011/0204301 | A1* | 8/2011 | Akagi | H01M 4/1391 252/519.33 |
| 2013/0330615 | A1 | 12/2013 | Morita et al. | |
| 2014/0079995 | A1 | 3/2014 | Wakada | |

FOREIGN PATENT DOCUMENTS

| JP | 2008-34378 A | 2/2008 |
|---|---|---|
| JP | 2009-193805 A | 8/2009 |
| JP | 2009-200007 A | 9/2009 |
| JP | 2010-86955 A | 4/2010 |
| JP | 2011-70908 A | 4/2011 |
| WO | 2012/111116 A1 | 8/2012 |
| WO | 2012/165422 A1 | 12/2012 |

OTHER PUBLICATIONS

English Translation of JP 2011-070908 (Kadowaki et al.) previously made of record (Year: 2011).*
Office Action dated Nov. 23, 2017, issued in counterpart European Application No. 14 841 201.8. (6 pages).
International Preliminary Report on Patentability (Form PCT/IB/373) issued in counterpart International Application No. PCT/JP2014/064290 dated Mar. 1, 2016, with PCT/ISA/237 (8 pages).
Extended (supplementary) European Search Report dated Jan. 5, 2017, issued in counterpart European Application No. 14841201.8. (9 pages).
International Search Report dated Jul. 8, 2014, issued in counterpart Application No. PCT/JP2014/064290 (2 pages).

* cited by examiner

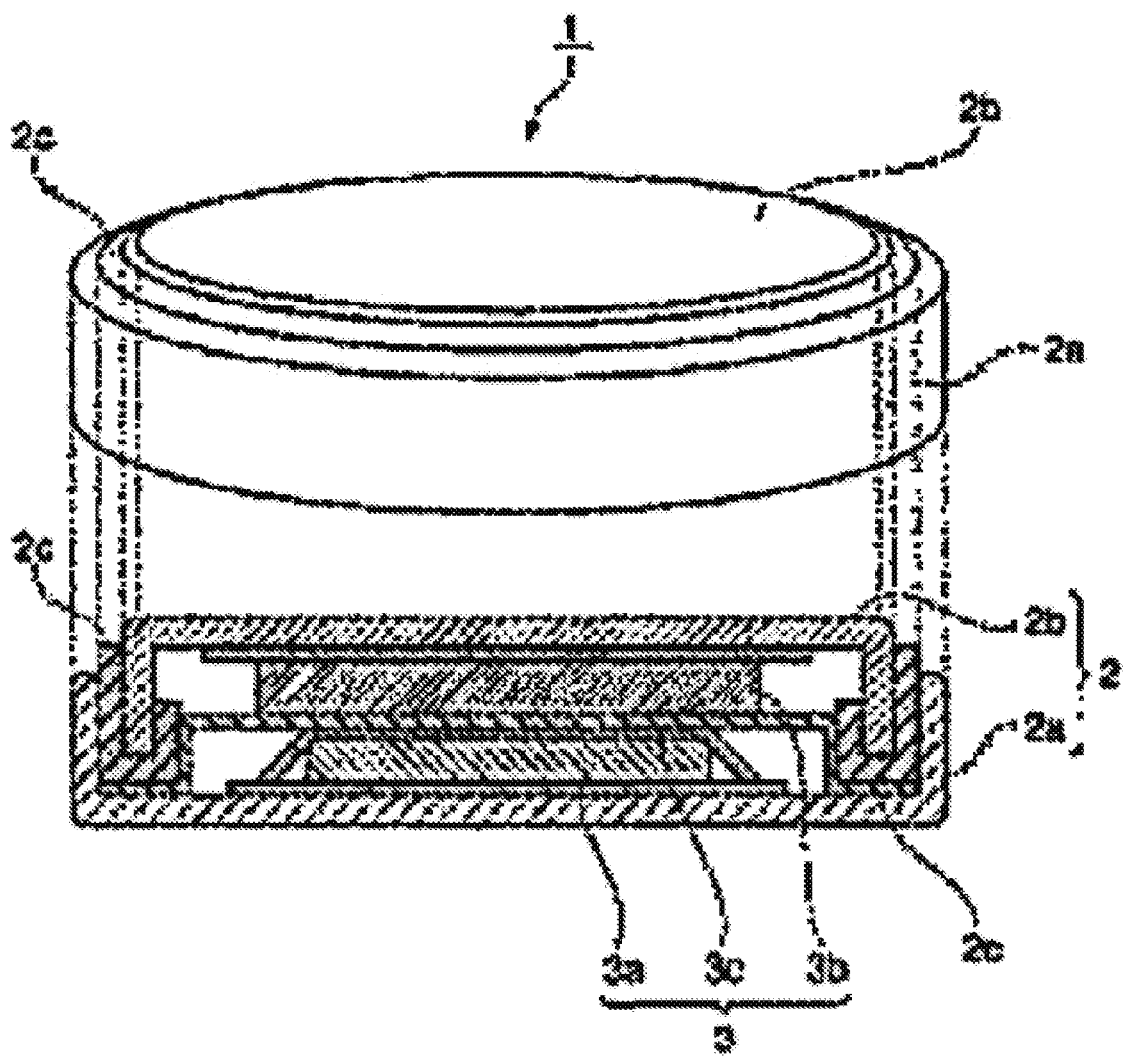
2032-type coin battery

METHOD FOR PRODUCING POSITIVE ELECTRODE ACTIVE MATERIAL FOR NONAQUEOUS ELECTROLYTE SECONDARY BATTERIES, POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

TECHNICAL FIELD

The present invention relates to a method for producing a positive electrode active material for nonaqueous electrolyte secondary batteries, a positive electrode active material for nonaqueous electrolyte secondary batteries, and a nonaqueous electrolyte secondary battery.

BACKGROUND ART

Nonaqueous electrolyte secondary batteries are lightweight and provide high energy density. For these reasons, such batteries are increasing their importance as power supplies mounted on vehicles using electricity as a driving source or as power supplies used in personal computers, mobile terminals, other electric products, and the like.

Typical nonaqueous electrolyte secondary batteries include lithium-ion secondary batteries, which are charged or discharged when lithium ions move between the positive electrode and negative electrode. In an electrode of a typical lithium-ion secondary battery, electrode materials including, as a main component, an electrode active material capable of reversibly occluding and releasing lithium ions are layered (electrode mixture material layer) on an electrode collector.

For example, a positive electrode mixture material layer serving as a positive electrode is formed by dispersing and kneading particles of a lithium-containing compound serving as a positive electrode active material, a conductive material such as carbon black, and a binder such as polyvinylidene fluoride (PVDF) in an appropriate solvent to prepare a positive electrode mixture material paste, which is a kneaded pasty composition (pasty compositions include slurry compositions and ink-like compositions), applying the paste to a positive electrode collector such as an aluminum material, and drying it.

An organic solvent (e.g., N-methylpyrrolidone) or aqueous medium (e.g., Patent Literature 1) is used as a solvent used to prepare a positive electrode mixture material paste. If an aqueous medium is used as a solvent, lithium ions may be eluted from the surfaces of particles of the lithium-containing compound serving as a positive electrode active material into the solvent due to water contained in the solvent. Thus, the positive electrode mixture material paste itself may be strongly alkalized. If the positive electrode mixture material paste (composition) is alkalized, the binder contained therein may decompose or aggregate (gel), or the positive electrode active material may aggregate. Even if an organic solvent is used as the solvent, the decomposition, gelation, or the like of the binder contained in the positive electrode mixture material paste may occur due to the influence of a trace amount of water contained in the solvent (Patent Literature 2). Further, if the production process is being performed in a humid location, water from outside air flows in, thereby making the positive electrode mixture material paste more likely to gel.

Such decomposition or aggregation of the positive electrode materials results in a reduction in the viscosity or adhesion of the positive electrode mixture material paste, as well as a reduction in dispersibility. For these reasons, it is difficult to form a positive electrode mixture material layer having a desired thickness and a uniform composition on the positive electrode collector. A positive electrode mixture material layer having a non-uniform thickness or composition is not preferred, since such a positive electrode mixture material layer degrades battery reactivity during charge or discharge and can increase the internal resistance of the battery.

For example, Patent Literature 2 proposes a positive electrode active material for nonaqueous electrolyte secondary batteries intended to suppress the decomposition or gelation of the positive electrode materials and having a composition represented by $Li_xNi_{1-y}A_yO_2$ where $0.98 \leq x \leq 1.06$; $0.05 \leq y \leq 0.30$; and A represents at least one of Co and Al. For this positive electrode active material, if 5 g thereof is mixed and stirred with 100 g of pure water for 120 minutes and then is let stand for 30 seconds, the pH of the resulting supernatant is 12.7 or less at 25° C.

Although Patent Literature 2 discloses that the gelation resistance is improved by controlling the pH of the positive electrode active material, it does not describe a specific method for producing the positive electrode active material.

Patent Literature 3 proposes a method for producing a porous metal oxide-coated positive electrode active material. This method includes a sol-gel step of forming a gel coat in which a metal organic compound and a micelle surfactant are dispersed and adhere, on a positive electrode active material and a firing step of firing the gel coat formed in the sol-gel step to decompose and remove the surfactant so as to form a porous metal oxide coating layer having pores through which lithium ions can move, on the positive electrode active material. This proposal discloses that the positive electrode active material particles are coated with an $Al_2O_3$ or $ZrO_2$ film to reduce the direct contact between the positive electrode active material particles and an electrolyte so as to suppress the elution of lithium ions.

Patent Literature 4 proposes the following battery: the battery includes a positive electrode and a negative electrode; the positive electrode includes a positive electrode collector and a positive electrode mixture material layer formed on the collector and including at least a positive electrode active material and a binder; the positive electrode active material is coated with a hydrophobic coat; and the binder is dissolved or dispersed in an aqueous medium. This proposal discloses that since the positive electrode active material is coated with the hydrophobic coat, the contact between the positive electrode active material and the aqueous medium can be prevented and variations in the viscosity of the composition are reduced.

CITATION LIST

Patent Literature

[Patent Literature 1] Japanese Unexamined Patent Application Publication No. 2009-193805
[Patent Literature 2] Japanese Unexamined Patent Application Publication No. 2003-31222
[Patent Literature 3] Japanese Unexamined Patent Application Publication No. 2009-200007
[Patent Literature 4] International Publication WO2012/111116

SUMMARY OF INVENTION

Technical Problem

However, the positive electrode active material production methods disclosed in Patent Literatures 3 and 4 have many problems including the following: coating of the active material particles with a coat by chemisorption requires long-time stirring; and since the materials are mechanically mixed until bound together to form a coat, the surfaces of the active material particles are damaged or the particles per se are crushed. Accordingly, there is a demand for a technique that can achieve both high battery performance and the suppression of the decomposition or gelation of the positive electrode materials and allows a positive electrode active material to be easily obtained.

To solve the above conventional problems, an object of the present invention is to provide a positive electrode active material that can improve water resistance and suppress the gelation of a positive electrode mixture material paste without impairing the original battery performance of the positive electrode active material, and a method for easily producing the positive electrode active material.

Solution to Problem

To solve the above problems, the present inventors have intensively contemplated the formation of a coating layer that can suppress the elution of lithium ions from the surfaces of positive electrode active material particles. As a result, the present inventors found that in a coating layer obtained by mixing fine carbon particles, an organic dispersant, a hydrophobic coat forming agent, positive electrode active material particles, and an organic solvent and evaporating and drying the mixture, the fine carbon particles and hydrophobic coat forming agent were uniformly dispersed and that it was possible to improve water resistance while improving the conductivity between the positive electrode active material particles, and then completed the present invention.

That is, a method for producing a positive electrode active material for nonaqueous electrolyte secondary batteries of the present invention includes a mixing step of preparing a mixture comprising fine carbon particles, an organic dispersant, a hydrophobic coat forming agent, an organic solvent, and positive electrode active material particles, a drying step of drying the mixture to obtain the mixture containing the organic solvent in a reduced amount, and a heat treatment step of heat-treating the mixture containing the organic solvent in the reduced amount to obtain a positive electrode active material having a coating layer comprising at least the fine carbon particles, the organic dispersant, and the hydrophobic coat forming agent.

In a first preferred aspect of the production method, the mixing step includes previously mixing the fine carbon particles, the organic dispersant, the hydrophobic coat forming agent, and at least part of the organic solvent to obtain a carbon-containing composition (1) and then mixing the carbon-containing composition (1) and other components to prepare the mixture.

In a second preferred aspect, the mixing step includes previously mixing the fine carbon particles, the organic dispersant, and at least part of the organic solvent to obtain a carbon-containing composition (2) and then mixing the carbon-containing composition (2) and other components to prepare the mixture.

The mixing step preferably includes preparing the mixture in such a manner that an average particle diameter of the fine carbon particles in the mixture is 10 to 100 nm.

The organic dispersant is preferably polyoxyethylene, a polycarboxylic acid polymeric dispersant, or both thereof. The polyoxyethylene is preferably at least one selected from the group consisting of polyoxyethylene stearate, polyoxyethylene sorbitan stearate, polyoxyethylene oleate, and polyoxyethylene sorbitan oleate.

The hydrophobic coat forming agent is preferably hydroxyl-containing dimethylsiloxane. The organic solvent in the mixture is preferably a solvent obtained by mixing at least one selected from lower alcohols consisting of 2-propanol and ethanol and at least one selected from glycols consisting of ethylene glycol, propylene glycol, and hexylene glycol.

The mixing step preferably includes adjusting viscosity of the mixture so that the viscosity is in a range of 100 to 10000 mPa·s. The mixing step preferably includes preparing the mixture using a rotation-revolution kneading mixer.

The heat treatment step preferably includes controlling a heat treatment temperature to a range of 80 to 400° C. in an atmosphere selected from an oxygen-containing atmosphere, an inert atmosphere, and a vacuum atmosphere.

A positive electrode active material for nonaqueous electrolyte secondary batteries of the present invention has a coating layer on particles thereof. The coating layer includes fine carbon particles, an organic dispersant, and a hydrophobic coat forming agent. The fine carbon particles are dispersed in the coating layer.

The particles of the positive electrode active material are preferably particles formed of one or more selected from the group consisting of a lithium-nickel composite oxide, a lithium-cobalt composite oxide, a lithium-nickel-cobalt-manganese composite oxide, and a lithium-manganese composite oxide.

In the positive electrode active material for nonaqueous electrolyte secondary batteries of Claim 12 or 13, if 1 g of the positive electrode active material for nonaqueous electrolyte secondary batteries is added to 50 ml of pure water of 24° C. to prepare slurry and then the slurry is left alone for 60 minutes, then pH of the slurry at 24° C. is 11 or less, and then conductivity thereof is 200 μS/cm or less, and if the positive electrode active material is exposed to a thermohygrostat having a temperature of 30° C. and a humidity of 70% RH for six days, the rate of increase of a mass of the positive electrode active material after exposure with respect to the mass thereof before the exposure is 1.0% or less.

A nonaqueous electrolyte secondary battery includes a positive electrode including a positive electrode active material and a conductive material, a negative electrode including a negative electrode active material, a separator, and a nonaqueous electrolyte. The above positive electrode active material for nonaqueous electrolyte secondary batteries is used as the positive electrode active material.

Advantageous Effects of the Invention

The present invention provides a positive electrode active material for nonaqueous electrolyte secondary batteries that has a coating layer formed on the particles thereof and has improved water resistance. By preparing a positive electrode mixture material paste using the positive electrode active material, the elution of lithium ions is suppressed, and the gelation of the positive electrode mixture material paste is suppressed. Further, the positive electrode active material is insusceptible to the humidity of outside air. Accordingly, even when the production process is not performed in a less humid location, such as a dry room, the gelation of the positive electrode active material is suppressed. Thus, the handleability of the positive electrode active material is improved. Further, the positive electrode active material for nonaqueous electrolyte secondary batteries of the present invention contains the fine carbon particles having high conductivity in the coating layer and thus can control increases in the internal resistance of the battery.

Further, the production method of the present invention is easy and suitable for industrial-scale production, as well as is less likely to damage the surfaces of the positive electrode active material particles. Thus, this production method can prevent the degradation of battery characteristics and has an extremely high industrial value.

BRIEF DESCRIPTION OF THE DRAWINGS

FIGURE is a schematic view of a 2032-type coin battery used to evaluate a battery.

DESCRIPTION OF EMBODIMENTS

Method for Producing Positive Electrode Active Material for Nonaqueous Electrolyte Secondary Batteries A method for producing a positive electrode active material for nonaqueous electrolyte secondary batteries of the present invention (hereafter referred to as "the production method of the present invention") is characterized in that it forms, on positive electrode active material particles, a coating layer for suppressing the contact between the particles and water by mixing fine carbon particles, an organic dispersant, a hydrophobic coat forming agent, an organic solvent, and the positive electrode active material particles, evaporating the organic solvent in the mixture to dry the mixture, and then heat-treating the dried mixture. Thus, a positive electrode active material of the present invention having improved water resistance is obtained. Now, the steps of the method will be described in detail.

Mixing Step

A mixing step of is a step of preparing a mixture containing fine carbon particles, an organic dispersant, a hydrophobic coat forming agent, an organic solvent, and positive electrode active material particles. The fine carbon particles, organic dispersant, and hydrophobic coat forming agent are preferably added in amounts corresponding to the contents of the components of a positive electrode active material to be obtained finally, since the amounts of these materials added to the mixture and the contents of these materials in the positive electrode active material to be obtained finally are approximately equal.

The fine carbon particles may be of any type as long as they can provide the coating layer with conductivity. However, fine carbon particles which are easily dispersed in alcohol are preferred, since such fine carbon particles exhibits excellent dispersibility in the mixture. Examples of preferred fine carbon particles include various types of carbon black, such as acetylene black, furnace black, and Ketjen black, and graphite powder. Acetylene black is more preferable. The fine carbon particles may be one of these types or may be two or more thereof.

The amount of the fine carbon particles contained in the mixture is preferably 0.1 to 10 parts by mass, more preferably 0.1 to 3 parts by mass with respect to 100 parts by mass of the positive electrode active material particles in the mixture. If the amount is less than 0.1 part by mass, a sufficient amount of fine carbon particles may not be contained in the coating layer. Also, if the amount is more than 10 parts by mass, the coating layer may not have a uniform thickness. By setting the amount of fine carbon particles to 0.1 to 10 parts by mass, the coating layer can contain a sufficient amount of fine carbon particles, as well as can have a more uniform thickness.

In the mixing step, the mixture is prepared in such a manner that the average particle diameter of the fine carbon particles therein is preferably 10 to 100 nm, more preferably 30 to 85 nm, even more preferably 40 to 80 nm. The fine carbon particles may be previously crushed so that the average particle diameter becomes 10 to 100 nm, and then used. By setting the average particle diameter to 10 to 100 nm, the fine carbon particles can be dispersed uniformly in the mixture, as well as uniformly in the coating layer. If the average particle diameter is less than 10 nm, the fine carbon particles may aggregate in the mixture, as well as are not easy to handle and therefore are not preferred. On the other hand, if the average particle diameter is more than 100 nm, the fine carbon particles may not be dispersed uniformly in the coating layer. The average particle diameter is, for example, a volume mean diameter obtained by laser diffraction/scattering.

The organic dispersant may be of any type as long as it improves the dispersibility of the fine carbon particles. However, the organic dispersant is preferably at least one selected from the group consisting of polyoxyethylene such as polyoxyethylene stearate, polyoxyethylene sorbitan stearate, polyoxyethylene oleate, and polyoxyethylene sorbitan oleate, acrylic acids such as alkyl acrylate, alkyl methacrylate, polyethylene glycol acrylate, polyethylene glycol methacrylate, polypropylene glycol acrylate, and polypropylene glycol methacrylate, and polycarboxylic acids such as methacrylic acid polymeric agent. These organic dispersants have the effect of significantly improving the dispersibility of the fine carbon particles and therefore can disperse the fine carbon particles in the mixture more uniformly.

The amount of the organic dispersant contained in the mixture is preferably 0.01 to 3 parts by mass, more preferably 0.01 to 0.5 part by mass with respect to 100 parts by mass of the positive electrode active material particles in the mixture. If the amount is less than 0.01 part by mass, the organic dispersant may not sufficiently disperse the fine carbon particles in the mixture. If the amount is more than 3 parts by mass, the organic dispersant may excessively increase the viscosity of the mixture and thus may cause a problem that too thick a coating layer or nonuniform coating layer is formed. By setting the amount of the organic dispersant to within the above range, the fine carbon particles are sufficiently dispersed in the mixture, as well as uniformly dispersed in the obtained coating layer. Thus, it is possible to improve the uniformity of the coating layer, which is obtained by properly controlling the viscosity of the mixture.

The hydrophobic coat forming agent is, for example, alkyl-containing siloxane or a compound thereof and is preferably polysiloxane whose alkyl is partially substituted by hydroxyl, particularly a hydroxyl-containing polydimethylsiloxane. Typical hydrophobic coat forming agents include silane compounds, and a coat formed using a silane compound and dried exhibits hydrophobicity. However, such a coat has to be subjected to a preliminary process such as hydrolysis before used. On the other hand, alkyl-containing siloxane used in the present invention is highly hydrophobic, particularly highly water-resistant. Further, hydroxyl-containing polydimethylsiloxane need not be subjected to a preliminary process and can be easily dissolved in the mixture.

The amount of the hydrophobic coat forming agent contained in the mixture is preferably 0.2 to 5 parts by mass, more preferably 0.2 to 2 parts by mass with respect to 100 parts by mass of the positive electrode active material particles in the mixture. If the amount is less than 0.2 part by mass, a sufficient amount of hydrophobic coat forming agent may not be contained in the coating layer. If the amount is more than 5 parts by mass, the viscosity of the mixture may be excessively increased and thus a problem may occur that too thick a coating layer or nonuniform coating layer is formed. By setting the amount of the hydrophobic coat forming agent to within the above range, the hydrophobic coat forming agent can be contained in the mixture in such a manner that it can be contained in a sufficient amount in the coating layer. Thus, it is possible to improve the uniformity of the coating layer, which is obtained by properly controlling the viscosity of the mixture.

The organic solvent may be of any type, and a known organic solvent may be used. However, the organic solvent is preferably a solvent obtained by mixing at least one selected lower alcohols consisting of 2-propanol and ethanol and at least one selected from glycols consisting of ethylene glycol, propylene glycol, and hexylene glycol (hereafter referred to as "the mixed solvent"). Glycol serves as a binder for the fine carbon particles and has effects such as the stabilization of liquid preservability and the facilitation of coat formation by improving wettability with respect to the surface of the positive electrode active material. Further, after the coat is formed, the remaining glycol itself improves water resistance. By using the mixed solvent of lower alcohol and glycol, it is possible to produce the effects of glycol described above, as well as to easily volatilize the lower alcohol in subsequent steps, a concentration step and a firing step.

The proportion of the lower alcohol in the mixed solvent is preferably 80% by mass or more, more preferably 90% by mass or more with respect to the total amount of the lower alcohol and glycol of 100% by mass. If the proportion of the lower alcohol is less than 80% by mass, concentration based on volatilization may not proceed and thus handleability may degrade in the concentration step. On the other hand, to produce the above effects of glycol, the proportion of the lower alcohol is preferably 99% by mass or less.

By setting the proportion of the lower alcohol to 80% or more by mass, more preferably 80 to 99% by mass, it is possible to improve handleability in the concentration step while producing the effects of glycol.

The amount of the organic solvent contained in the mixture is preferably 2 to 20 parts by mass, more preferably 4 to 15 parts by mass with respect to 100 parts by mass of the positive electrode active material particles in the mixture. If the amount is less than 2 parts by mass, the viscosity of the mixture may be increased excessively, and mixing in the mixing step may become insufficient. Consequently, a uniform coating layer may not be formed on the positive electrode active material particles. On the other hand, if the amount is more than 20 parts by mass, it takes a long time to concentrate the organic solvent. This is not economical. Further, components of a coating layer liberated during concentration remain in the supernatant. Consequently, a problem may occur that the components remain on the mixture in a high concentration after concentration. By setting the amount of the organic solvent to 2 to 20 parts by mass, it is possible to improve the uniformity of the components of the mixture and to form a more uniform coating layer on the positive electrode active material particles. The organic solvent is less in amount than a typical surface treatment composition and therefore can be easily concentrated.

The production method of the present invention can be applied to almost all positive electrode active materials. As the positive electrode active material particles, for example, there can be used particles formed of a lithium-nickel composite oxide, lithium-cobalt composite oxide, lithium-nickel-cobalt-manganese composite oxide, or lithium-manganese composite oxide. In the production method of the present invention, the particle structure or particle size distribution of a positive electrode active material to be obtained is approximately equivalent to that of the positive electrode active material used as a raw material. Accordingly, the average particle diameter of the positive electrode active material used as a raw material is preferably equivalent to that of a positive electrode active material to be obtained finally. Specifically, the average particle diameter is preferably 3 to 25 µm, more preferably 3 to 15 µm. As used herein, the average particle diameter refers to a median diameter (d50) and is measured using a particle counter based on laser diffraction/scattering.

In the mixing step, the viscosity of the mixture is adjusted so as to be preferably in a range of 100 to 10000 mPa·s, more preferably in a range of 200 to 850 mPa·S, even more preferably in a range of 300 to 800 mPa·S. By adjusting the viscosity to a range of 100 to 10000 mPa·s, the kneadability of the mixture becomes sufficient; the dispersibility of the components of the mixture is improved; and the components of the coating layer become more uniform. Further, it is possible to suppress the segregation of the components of the coating layer due to the occurrence of a supernatant in the concentration step. If the viscosity is less than 100 mPa·s, a supernatant may occur in the concentration step; if the viscosity is more than 10000 mPa·s, mixing may be not performed sufficiently and thus the uniformity of the coating layer may be impaired. The viscosity of the mixture can be controlled using the amount of the organic solvent added. A viscosity less than 100 mPa·s means that the amount of the organic solvent added is too much; a viscosity more than 10000 mPa·s means that the amount of the organic solvent added is too little. For this reason, the amount of the organic solvent added is adjusted.

In the mixing step, any mixing method may be used to prepare a mixture as long as the mixing method allows for sufficient mixing of the respective materials. The mixing method may be a known method, but is preferably the use of a rotation-revolution kneading mixer. Such a kneading mixer can mix the materials uniformly and quickly while applying a proper shear force to the mixture. For example, if the amount to be processed is 20 to 50 g, a preferable mixing time is to 5 minutes. The mixing time can be adjusted in accordance with the amount to be processed. By mixing the materials quickly using a rotation-revolution kneading mixer, it is possible to suppress damage to the particle surfaces. On the other hand, if there is used an apparatus which directly applies a large force to the positive electrode active material particles, such as a bead mill, ball mill, rod mill, or homogenizer, problems may occur including the crush of the positive electrode active material particles, significant damage to the particle surfaces, and a reduction in battery characteristics.

Typically, the fine carbon particles added to the mixture often form aggregates of a several µm to several tens of µm. Decomposing these aggregates into particles having an average particle diameter of 10 to 100 nm requires applying a strong shear force thereto. For this reason, if fine carbon particles forming aggregates are used, the production method preferably includes, in the mixing step, a step of previously kneading such fine carbon particles, an organic dispersant, and a hydrophobic coat forming agent, and at least part of an organic solvent to obtain a carbon-containing composition (1) or a step of previously kneading such fine carbon particles, an organic dispersant, and at least part of an organic solvent to obtain a carbon-containing composition (2). Thus, it is possible to sufficiently disperse the fine carbon particles while suppressing the crush of the positive electrode active material particles or damage to the particle surfaces.

The steps of obtaining the carbon-containing compositions (1) and (2) aim to decompose the fine carbon particles into particles having an average particle diameter of 10 to 100 nm. Accordingly, it is preferred to use an apparatus which can apply a strong shear force, for example, a bead mill, ball mill, rod mill, or homogenizer.

If the carbon-containing composition (1) is obtained by decomposing the fine carbon particles, the positive electrode active material particles and the like are added thereto and mixed, thereby giving the mixture finally; if the carbon-containing composition (2) is obtained by decomposing the fine carbon particles, the positive electrode active material, part of the remaining organic dispersant, the hydrophobic coat forming agent, and the like are added thereto and mixed, thereby giving the mixture finally. During mixing, an adjustment is preferably made so that the mixed components fall within the above composition ranges.

Drying Step

A drying step is a step of evaporating the organic solvent in the mixture obtained in the mixing step to dry the mixture. In the drying step, a coating layer is formed on the positive electrode active material particles. In this case, the organic solvent need not completely be evaporated as long as a coating layer is formed on the positive electrode active material particles and can be heat-treated in a subsequent step. The organic solvent in the mixture only has to be evaporated and reduced to an extent that the particles do not adhere to each other.

A conventional coating method using a metal alkoxide has a problem that lithium ions elute from a positive electrode active material due to water introduced to hydrolyze the metal alkoxide. Further, due to the bonds between hydroxyl groups in the metal alkoxide, it takes a long time to form a coat. During the several-hour coat formation time and the subsequent drying time, not only the battery characteristics degrade, but also productivity decreases, resulting in a cost problem.

On the other hand, the production method of the present invention uses the above mixed solvent, which is easily evaporated, and reduces the amount of the organic solvent added, and thus can further suppress the elution of lithium ions and improve productivity.

Spray drying is similar to the production method of the present invention since the production method of the present invention, since it is a coating method based on evaporation and drying. For example, a coat can be formed on a positive electrode active material by using a spray drier, mist drier, or the like. However, in spray drying, a coat is formed in the midst of falling of coating materials riding on dry air from above. For this reason, the falling coat materials are bound to each other, forming coarse aggregates. In view of this problem, the present invention forms a thin, uniform coating layer using a predetermined amount of organic solvent, particularly, lower alcohol. Thus, it is possible to form a coat while maintaining a particle size distribution approximately equivalent to that of the positive electrode active material particles used as a raw material.

To allow the mixture to be dried in a short time, the drying temperature is preferably 50 to 100° C. If the drying temperature is less than 50° C., it takes a long time to dry the mixture, thereby reducing productivity. On the other hand, assuming that lower alcohol is used as a solvent, if the drying temperature is more than 100° C., vigorous evaporation may occur and thus powder may scatter. The drying time is preferably a length such that the organic solvent has yet to evaporate and thus the particles have yet to adhere to each other. Specifically, the drying time is preferably 1 to 5 hours. If the drying time is less than 1 hour, drying may be insufficient; if the drying time is more than 5 hours, productivity simply decreases.

In the production method, the drying temperature is low and therefore any atmosphere may be used for drying. However, an air atmosphere is preferably used in terms of handleability and cost.

Heat Treatment Step

A heat treatment step is a step of heat-treating the dried mixture to obtain a coated positive electrode active material. More specifically, the heat treatment step is a step of fixing the coating layer formed on the positive electrode active material particles in the drying step onto the particles by heat treatment and removing unnecessary components remaining in the coating layer to improve film quality. Thus, the coating layer is strongly fixed onto the positive electrode active material particles, thereby obtaining a positive electrode active material in which the coating layer is not peeled off even when kneading or the like is performed during the production of a battery.

The heat treatment temperature is preferably in a range of 80 to 400° C., more preferably in a range of 120 to 300° C.

Thus, it is possible to fix the coating layer onto the positive electrode active material particles while suppressing the alteration of the coating layer. Further, it is possible to remove unnecessary components, such as the organic solvent, remaining in the coating layer and to suppress gas from the coating layer when using the positive electrode active material as the active material of a battery. If the heat treatment temperature is less than 80° C., the unnecessary organic solvent may remain in the coating layer and thus a problem may be caused that gas occurs from the coating layer when using the positive electrode active material as the active material of a battery. If the heat treatment temperature is more than 400° C., the components of the coating layer may be decomposed or burned and thus the characteristics of the coating layer may degrade.

The heat treatment time is preferably 0.5 to 10 hours, more preferably 1 to 5 hours. Thus, it is possible to sufficiently fix the coating layer onto the positive electrode active material particles and to sufficiently remove the unnecessary organic solvent. If the heat treatment time is less than 0.5 hour, the coating layer may not be sufficiently fixed to the positive electrode active material particles, and the unnecessary organic solvent may not be sufficiently removed. If the heat treatment time is more than 10 hours, the characteristics of the coating layer may degrade.

The atmosphere for heat treatment is preferably an atmosphere selected from an oxygen-containing atmosphere, an inert atmosphere, and a vacuum atmosphere. In these atmospheres, heat treatment can be performed without damaging the positive electrode active material. On the other hand, in a reducing atmosphere, the positive electrode active material or coating layer may be damaged and thus the characteristics of the obtained positive electrode active material may degrade.

Positive Electrode Active Material for Nonaqueous Electrolyte Secondary Batteries A positive electrode active material for nonaqueous electrolyte secondary batteries of the present invention (hereafter also referred to as "the positive electrode active material of the present invention") is characterized in that a coating layer is formed on the particles of the positive electrode active material; the coating layer contains fine carbon particles, an organic dispersant, and a hydrophobic coat forming agent; and the fine carbon particles are dispersed in the coating layer.

Since the fine carbon particles are dispersed in the coating layer, conductive networks are formed among the fine carbon particles in the coating layer. Thus, it is possible to control a reduction in the conductivity among the positive electrode active material particles resulting from the formation of the coating layer and to control an increase in internal resistance when this positive electrode active material is used as the positive electrode active material of a battery. As a result, the battery maintains excellent output characteristics. Preferably, the fine carbon particles are dispersed uniformly in the coating layer. Thus, the effect of controlling an increase in internal resistance can be further increased. Preferably, the hydrophobic coat forming agent is also uniformly present in the coating layer. Thus, the water resistance of the positive electrode active material can be further improved.

In the present specification, the expression "the fine carbon particles are dispersed in the coating layer" refers to a state in which the fine carbon particles are approximately uniformly present in the coating layer without forming aggregates of several μm or more.

Typically, a positive electrode active material has poor conductivity. For this reason, the internal resistance of the positive electrode is usually improved by adding a carbon material, such as carbon black, serving as a conductive material to the positive electrode material layer. Moreover, the positive electrode active material may be coated with a conductive carbon material to further improve the internal resistance of the positive electrode. Examples of the method for performing this process include: mechanically binding a carbon material to the surface of the positive electrode active material; and immersing a carbon source (e.g., sucrose) in an appropriate solution and stirring so that the positive electrode active material adsorbs the carbon source. However, the coat such as the carbon material or carbon source is often only locally bound to the surface of the positive electrode active material without covering the entire surface. Even when the coat is heat-treated to prevent the desorption thereof, it is often peeled, desorbed, or split. While the internal resistance of the positive electrode is expected to be improved by forming a coat such as a carbon material, the water resistance or moisture resistance of the positive electrode active material is difficult to improve due also to the influence of the peel or split of the coat.

To improve the water resistance or moisture resistance of the positive electrode active material, a hydrophobic coat may be formed on the positive electrode active material particles. However, the conductivity of the hydrophobic coat is extremely low and thus the conductivity of the positive electrode active material further degrades.

On the other hand, the present invention uses fine carbon particles, as well as an organic dispersant, an organic solvent, and a hydrophobic coat forming agent also serving as binders and thus forms a highly adhesive coating layer in which the fine carbon particles are dispersed uniformly. Owing to these effects, it is possible to improve the adhesion of the coating layer and to achieve both water resistance or moisture resistance and conductivity. That is, it is possible to provide a coating layer with a new function which a conventional carbon film does not have.

For the fine carbon particles used in the positive electrode active material of the present invention, the average particle diameter thereof in the coating layer is preferably 10 to 100 nm, more preferably 30 to 85 nm, even more preferably 40 to 80 nm. By setting the average particle diameter to within a range of 10 to 100 nm, more conductive networks are formed in the coating layer, and the conductivity among the positive electrode active material particles is further ensured. On the other hand, if the average particle diameter is less than 10 nm, less conductive networks may be formed and thus the conductivity between the positive electrode active material particles may not be obtained sufficiently. Also, if the average particle diameter is more than 100 nm, the fine carbon particles may be non-uniformly dispersed in the coating layer and thus the conductivity between the positive electrode active material particles may not be sufficiently obtained. The average particle diameter can be obtained by dissolving the coating layer in an organic solvent or the like and measuring the volume mean diameter by laser diffraction/scattering.

The content of the fine carbon particles in the coating layer is preferably 0.1 to 10 parts by mass, more preferably 0.5 to 3 parts by mass with respect to 100 parts by mass of the positive electrode active material particles serving as a core material. Thus, a sufficient number of conductive networks are formed in the coating layer. If the content of the fine carbon particles is less than 0.1 part by mass, less conductive networks may be formed and thus the conductivity between the positive electrode active material particles may not be obtained sufficiently. Also, if the amount is more than 10 parts by mass, a problem may occur that the strength or water resistance of the coating layer decreases.

The organic dispersant used in the positive electrode active material of the present invention may be of any type as long as it improves the dispersibility of the fine carbon particles. However, the organic dispersant is preferably at least one selected from the group consisting of polyoxyethylene such as polyoxyethylene stearate, polyoxyethylene sorbitan stearate, polyoxyethylene oleate, and polyoxyethylene sorbitan oleate, acrylic acids such as alkyl acrylate, alkyl methacrylate, polyethylene glycol acrylate, polyethylene glycol methacrylate, polypropylene glycol acrylate, and polypropylene glycol methacrylate, and polycarboxylic acids such as a methacrylic acid polymeric agent. Use of these organic dispersants allows for more uniform dispersion of the fine carbon particles in the coating layer, thereby further increasing the conductivity among the positive electrode active material particles.

The content of the organic dispersant in the coating layer is preferably 0.01 to 3 parts by mass, more preferably 0.05 to 0.5 parts by mass with respect to 100 parts by mass of the positive electrode active material particles serving as a core material. Thus, the fine carbon particles are dispersed more uniformly in the coating layer, so that higher conductivity is obtained. If the content of the organic dispersant is less than 0.01 part by mass, the fine carbon particles in the coating layer may be dispersed less uniformly in the coating layer and thus sufficient conductivity may not obtained. Also, if the content is more than 3 parts by mass, the relative content of the fine carbon particles or hydrophobic coat forming agent may be reduced and thus the characteristics of the coating layer may degrade.

The hydrophobic coat forming agent contained in the positive electrode active material of the present invention is preferably alkyl-containing siloxane or a compound thereof, more preferably polysiloxane whose alkyl is partially substituted by hydroxyl, even more preferably hydroxyl-containing polydimethylsiloxane. Alkyl-containing siloxane is highly hydrophobic and therefore can further increase the water resistance of the positive electrode active material.

The content of the hydrophobic coat forming agent in the coating layer is preferably 0.1 to 5 parts by mass, more preferably 0.2 to 2 parts by mass with respect to 100 parts by mass of the positive electrode active material particles serving as a core material. Thus, a positive electrode active material having higher water resistance is obtained. If the content of the hydrophobic coat forming agent contained is less than 0.1 part by mass, the hydrophobic coat forming agent in the coating layer may be reduced and thus sufficient water resistance may not be obtained. Also, if the content is more than 5 parts by mass, the relative content of the fine carbon particles may be reduced and thus a positive electrode active material having sufficient conductivity may not be obtained.

Glycol such as ethylene glycol, propylene glycol, or hexylene glycol may be further contained in the coating layer. If glycol is contained, the glycol produces a binder effect, thereby increasing the strength of the coating layer, or the glycol produces the effect of improving water resistance. The content of glycol in the coating layer is preferably 8 parts by mass or less, more preferably 6 parts by mass with respect to 100 parts by mass of the positive electrode active material particles serving as a core material. If the content of glycol is more than 8 parts by mass, the relative content of the fine carbon particles or hydrophobic coat forming agent may be reduced and thus the characteristics of the coating layer may degrade.

The positive electrode active material particles used in the positive electrode active material of the present invention may be of any type and may be known positive electrode active material particles. However, the particles are preferably primary particles, secondary particles, which are aggregates of primary particles, or both of a lithium-nickel composite oxide (e.g., $LiNiO_2$, $LiNiCoAlO_2$), a lithium-cobalt composite oxide (e.g., $LiCoO_2$), a lithium-manganese composite oxide (e.g., $LiMn_2O_4$), or a ternary lithium-containing composite oxide such as a lithium-nickel-cobalt-manganese composite oxide (e.g., $LiNi_{1/3}Co_{1/3}Mn_{1/3}O_2$). Since a lithium-nickel composite oxide having a high nickel (Ni) content has a high battery capacity, the particles are preferably positive electrode active material particles represented by General Formula (1) below, more preferably positive electrode active material particles represented by General Formula (2) below.

$$Li_aNi_{1-b}M_bO_2 \qquad \text{General Formula (1)}$$

where M represents at least one element selected from transition metal elements other than Ni, Group 2 elements, and Group 13 elements; $1.00 \leq a \leq 1.10$, and $0.01 \leq b \leq 0.5$.

$$Li_tNi_{1-x-y}Co_xM_yO_2 \qquad \text{General Formula (2)}$$

where M represents at least one element selected from the group consisting of Mg, Al, Ca, Ti, V, Cr, Mn, Zr, Nb, Mo, and W; $0.95 \leq t \leq 1.20$; $0 \leq x \leq 0.22$; and $0 \leq y \leq 0.1$)

While the above positive electrode active material particles are highly sensitive to water and more likely to degrade, the positive electrode active material of the present invention is coated with the hydrophobic coat so that the contact between the positive electrode active material and water can be prevented. Thus, both a high battery capacity and water resistance are achieved. That is, the positive electrode active material of the present invention is effective.

While the powder characteristics of the positive electrode active material may be selected in accordance with the characteristics that the target positive electrode active material is required to have, the average particle diameter, for example, is preferably 3 to 25 μm, more preferably 3 to 15 μm. By setting the average particle diameter to 3 to 25 μm, a high battery capacity or filling ability can be obtained. As used herein, the average particle diameter refers to a median diameter (d50) and is measured using a particle counter based on laser diffraction/scattering.

For the positive electrode active material of the present invention, if 1 g thereof is added to 50 ml of pure water of 24° C. to prepare slurry and then the slurry is left alone for 60 minutes, the then pH of the slurry at 24° is preferably 11 or less. By setting the pH to 11 or less, the positive electrode mixture material paste gelation suppression effect can be improved. The then conductivity of the slurry is preferably 200 μS/cm or less. An increase in conductivity is caused by the elution of alkali components, such as lithium, from the positive electrode active material. By setting the conductivity to 200 μS/cm or less, there is produced the effect of suppressing the elution of alkali components and suppressing the degradation of the positive electrode active material or the gelation of the positive electrode mixture material paste.

Also, for the positive electrode active material, if it is exposed to a thermohygrostat having a temperature of 30° C. and a humidity of 70% RH for 6 days, the rate of increase of the mass thereof after the exposure with respect to the mass thereof before the exposure is preferably 1.0% or less. An increase in mass is caused by moisture absorption and carbonation. A mass increase of 1.0% or less means that high water resistance was exhibited and the degradation of the positive electrode active material or the gelation of the positive electrode mixture material paste was suppressed.

A nonaqueous electrolyte secondary battery using the positive electrode active material of the present invention has a high capacity and a high output. In particular, if a nonaqueous electrolyte secondary battery using the positive electrode active material of the present invention obtained in a more preferable mode is used as, for example, the positive electrode of a 2032-type coin battery, a high initial discharge capacity of 160 mAh/g or more (180 mAh/g or more on more optimum conditions) and a low positive electrode resistance are obtained. Also, such a nonaqueous electrolyte secondary battery can be said to have high thermal stability and high safety.

Nonaqueous Electrolyte Secondary Battery

The elements of an embodiment of a nonaqueous electrolyte secondary battery of the present invention will be described in detail. The nonaqueous electrolyte secondary battery of the present invention is characterized in that it includes elements similar to those of a typical lithium ion secondary battery, such as a positive electrode, a negative electrode, and a nonaqueous electrolyte, and uses the positive electrode active material of the present invention as a positive electrode. The embodiment described below is only illustrative, and the nonaqueous electrolyte secondary battery of the present invention can be implemented in the embodiment below, as well as in forms obtained by making various changes or modifications thereto on the basis of the knowledge of those skilled in the art. The nonaqueous electrolyte secondary battery of the present invention may be used in any applications.

Positive Electrode

A positive electrode mixture material for forming a positive electrode and materials included in the mixture material will be described. The powdery positive electrode active material of the present invention, a conductive material, a binder, and, optionally activated carbon and a solvent for viscosity adjustment or other purposes are mixed and kneaded to prepare a positive electrode mixture material paste. The mixing ratio among the materials included in the positive electrode mixture material also serves as an important factor that determines the performance of a lithium secondary battery.

As in the positive electrode of a typical lithium secondary battery, the content of the positive electrode active material is preferably 60 to 95% by mass, the content of the conductive material is preferably 1 to 20% by mass, and the content of the binder is preferably 1 to 20% by mass with respect to all the mass of the solid content of the positive electrode mixture material except for the solvent of 100% by mass.

The prepared positive electrode mixture material paste is applied to a surface of a collector formed of an aluminum foil and dried to scatter the solvent. Optionally, the positive electrode mixture material paste may be pressed by roll press or the like to increase the electrode density. In this way, a sheet-shaped positive electrode can be produced. The sheet-shaped positive electrode can be used to produce a battery, for example, by cutting it into a size suitable for the target battery. The above positive electrode production method is only illustrative and other methods may be used.

Examples of the conductive material for producing the positive electrode include carbon black-based materials, such as graphite (natural graphite, artificial graphite, expanded graphite, etc.), acetylene black, and Ketjen black.

The binder has the function of binding active material particles together. Examples of the binder include fluorine-containing resins, such as polytetrafluoroethylene, polyvinylidene fluoride, and fluororubber, polypropylene, polyethylene, ethylene propylene diene rubber, styrene butadiene, cellulose-based resin, and polyacrylic acid. Optionally, the positive electrode active material, conductive material, and activated carbon are dispersed, and a solvent for dissolving the binder is added to the positive electrode mixture material.

Specific examples of the solvent include organic solvents, such as N-methyl-2-pyrrolidone, dimethylformamide, N,N-dimethylacetamide, N,N-dimethyl sulfoxide, and hexamethylphosphoramide, and aqueous media, such as water.

Activated carbon may be added to the positive electrode mixture material to increase the electric double layer capacity.

Negative Electrode

A negative electrode is formed by mixing a binder with metal lithium, lithium alloy, or the like or a negative electrode active material which can occlude and desorb lithium ions, adding an appropriate solvent to the mixture, applying the resulting pasty negative electrode mixture material to the surface of a collector formed of a metal foil, such as copper, drying the mixture material, and optionally compressing it to increase the electrode density.

Examples of the negative electrode active material include natural graphite, artificial graphite, fired bodies of organic compounds such as a phenol resin, the powder of carbon materials such as coke, and oxide materials such as a lithium-titanium oxide ($Li_4Ti_5O_{12}$). As in the positive electrode, the negative electrode binder may be a fluorine-containing resin, such as polyvinylidene fluoride. The solvent for dispersing the active material and binder may be an organic solvent, such as N-methyl-2-pyrrolidone.

Separator

A separator is sandwiched between the positive electrode and negative electrode. The separator separates the positive electrode and negative electrode and holds an electrolyte. A thin, porous film formed of polyethylene, polypropylene, or the like can be used as the separator.

Nonaqueous Electrolyte

A nonaqueous electrolyte is prepared by dissolving a lithium salt serving as a supporting electrolyte in an organic solvent. As the organic solvent, there can be used one or combinations of two or more selected from cyclic carbonates such as ethylene carbonate, propylene carbonate, butylene carbonate, and trifluoropropylene carbonate, chain carbonates such as diethyl carbonate, dimethyl carbonate, ethylmethyl carbonate, and dipropyl carbonate, ether components such as tetrahydrofuran, 2-methyltetrahydrofuran, and dimethoxyethane, sulfur compounds such as ethyl methyl sulfone and butanesultone, phosphorus compounds such as triethyl phosphate and trioctyl phosphate, and the like.

Examples of the supporting electrolyte include $LiPF_6$, $LiBF_4$, $LiClO_4$, $LiAsF_6$, $LiN(CF_3SO_2)_2$, and composite salts thereof.

The nonaqueous electrolyte may contain a radical scavenger, a surfactant, a flame retardant, and the like.

Shape and Configuration of Battery

The lithium secondary battery of the present invention including the positive electrode, negative electrode, separator, and nonaqueous electrolyte described above may take various shapes, including a cylindrical shape and a stacked shape.

Whatever shape the lithium secondary battery takes, the positive electrode and negative electrode are stacked with the separator therebetween to form an electrode body, and the electrode body is impregnated with the nonaqueous electrolyte. Collection leads or the like are used to connect a positive electrode collector and a positive electrode terminal leading to the outside and to connect a negative electrode collector and a negative electrode terminal leading to the outside. The lithium secondary battery thus configured is sealed in a battery case, thereby completing the battery.

EXAMPLES

Hereafter, the present invention will be specifically described using Examples. However, the present invention is not limited to these Examples. The Examples of the present invention were evaluated using the following method.

1. Evaluation Method

1) Evaluation of Water Resistance and Moisture Resistance of Coated Positive Electrode Active Material The water resistance was evaluated by adding 1 g of the positive electrode active material to 50 ml of pure water of 24° C., stirring the solution, leaving it alone for 60 minutes, and then measuring the pH and conductivity. The moisture resistance was evaluated by exposing the positive electrode active material to a thermohygrostat of 30° C. and 70% RH for 6 days and then obtaining the rate of increase of the mass thereof after the exposure with respect to the mass thereof before the exposure.

2) Production of Battery and Evaluation of Battery Characteristics Production of Battery To evaluate the positive electrode active material, a 2032-type coin battery 1 (hereafter referred to as "the coin-type battery") shown in FIG. 1 was used.

As shown in FIG. 1, the coin-type battery 1 includes a case 2 and a battery 3 contained in the case 2. The case 2 includes a hollow positive electrode can 2a having an opening at one end thereof and a negative electrode can 2b disposed at the opening of the positive electrode can 2a. When the negative electrode can 2b is disposed at the opening of the positive electrode can 2a, a space for containing the battery 3 is formed between the negative electrode can 2b and positive electrode can 2a.

The battery 3 includes a positive electrode 3a, a separator 3c, and a negative electrode 3b which are stacked in this order. The battery 3 is contained in the case 2 with the positive electrode 3a in contact with the inner surface of the positive electrode can 2a and with the negative electrode 3b in contact with the inner surface of the negative electrode can 2b. The case 2 includes a gasket 2c. The relative movement of the positive electrode 2a and negative electrode can 2b is fixed by the gasket 2c so that the positive electrode can 2a and negative electrode can 2b are kept in non-contact with each other. The gasket 2c also has a function of sealing the gap between the positive electrode can 2a and negative electrode can 2b to tightly blocking the movement of gas and liquid between the inside and outside of the case 2.

The coin-type battery 1 was produced as follows.

First, 52.5 mg of the positive electrode active material for nonaqueous electrolyte secondary batteries, 15 mg of acetylene black, and 7.5 mg of polytetrafluoroethylene (PTFE) resin were mixed to prepare a positive electrode mixture material. Then, the positive electrode mixture material was press-molded at a pressure of 100 mPa into a positive electrode 3a having a diameter of 11 mm and a thickness of 100 μm. The positive electrode 3a was dried in a vacuum drier at 120° C. for 12 hours. Using the positive electrode 3a, a negative electrode 3b, a separator 3c, and an electrolyte, the coin-type battery 1 was produced in an Ar-atmosphere glove box in which the dew point was controlled to −80° C. As the negative electrode 3b, there was used a negative electrode sheet formed by applying graphite powder having an average particle diameter of about 20 μm and polyvinylidene fluoride to a punched-out, disk-shaped copper foil having a diameter of 14 mm. As the separator 3c, a 25 μm-thick porous polyethylene film was used. As the electrolyte, there was used an equal amount mixed solution of ethylene carbonate (EC) and diethyl carbonate (DEC) using 1M of LiClO4 as a supporting electrolyte (available from TOMIYAMA PURE CHEMICAL INDUSTRIES, Ltd.).

To evaluate the gelation of a positive electrode mixture material paste, 8.5 g of the positive electrode active material, 1.0 g of acetylene black, 0.5 g of polyvinylidene fluoride (PVDF) resin, and 10.0 g of N-methyl-2-pyrrolidinone (solvent) were mixed using a rotation-revolution kneader (ARV-310LED available from THINKY CORPORATION) for one minute. The resulting positive electrode mixture material paste (described above) was left alone at room temperature for 2 weeks and then whether the paste had gelled was determined.
Evaluation of Battery Characteristics The initial discharge capacity and positive electrode resistance indicating the performance of the produced coin-type battery 1 were evaluated as follows.

The initial discharge capacity was obtained as follows: the produced coin-type battery 1 was left alone for about 24 hours; after an open circuit voltage (OCV) was stabilized, the current density with respect to the positive electrode was set to 0.1 mA/cm$^2$; the coin-type battery 1 was charged to a cut-off voltage of 4.3 V; after left at rest for one hour, the coin-type battery 1 was discharged to a cut-off voltage 3.0 V; and the then capacity thereof was used as the initial discharge capacity.

The positive electrode resistance was evaluated using the AC impedance method. Specifically, the positive electrode resistance was evaluated as follows: the coin-type battery 1 was charged at a charge potential 4.1V; the AC impedance was measured using a frequency response analyzer and a potentio-galvanostat (1255B available from Solartron Analytical) using the AC impedance method to obtain a Nyquist plot; since the Nyquist plot was represented as the sum of a characteristic curve indicating the solution resistance, the negative electrode resistance and the capacity thereof, and the positive electrode resistance and the capacity, a fitting calculation was performed using an equivalent circuit on the basis of this Nyquist plot so as to calculate the value of the positive electrode resistance; and the positive electrode resistance was evaluated in the form of a relative value using the positive electrode resistance of Comparative Example 1 as a reference value.

2. Examples and Comparative Examples

Example 1

Lithium-Nickel Composite Compound LiNiCoAlO$_2$

Lithium-nickel composite oxide powder obtained using a known technique was used as a positive electrode active material. Specifically, nickel oxide powder containing Ni as a main component and lithium hydroxide were mixed and fired to prepare lithium-nickel composite oxide powder represented by $Li_{1.06}ONi_{0.76}Co_{0.14}Al_{0.10}O_2$. The average particle diameter of this lithium-nickel composite oxide powder was 7.6 μm, and the specific surface area thereof was 0.82 m$^2$/g.
Preparation of Positive Electrode Active Material First, previously, 10 parts by mass of fine carbon particles (product name "HS100" available from Denka Company Limited) and 1 part by mass of a polycarboxylic acid-based polymeric dispersant (product name "HOMOGENOL L18" available from Kao Corporation) were added to 2-propanol to prepare a carbon-containing composition (2) (hereafter referred to as "the dispersion liquid").

Then, 20 g of the lithium-nickel composite oxide powder was extracted and defined as 100 parts by mass, and 5 parts by mass of 2-propanol (IPA: special grade chemical available from Kanto Chemical Co., Inc.) was added thereto. Further, 0.5 part by mass of hydroxyl-containing polydimethylsiloxane (PRX413 available from Dow Corning Toray Co., Ltd.) and 0.2 part by mass of propylene glycol (special grade chemical available from Kanto Chemical Co., Inc.) were added. Further, 0.5 part by mass of the fine carbon particles, 0.05 part by mass of the polycarboxylic acid polymeric dispersant, and 4.8 part by mass of 2-propanol were separated from the dispersion liquid and added.

Then, the components were mixed using a rotation-revolution kneader (ARV-310LED available from THINKY CORPORATION) for one minute to prepare a mixture. The viscosity of this mixture was 710 mPa·S, and the average particle diameter of the fine carbon particles in the mixture was 45 nm. Then, the mixture was dried at 80° C. for one hour and further heat-treated in an air atmosphere of 150° C. for one hour to obtain a positive electrode active material. The average particle diameter of the obtained positive electrode active material was 7.6 μm; the initial discharge capacity thereof was 197 mAh/g; and the positive electrode resistance thereof was 1.4. The pH indicating the evaluation of water resistance was 9.6; the conductivity was 70 μS/cm; and the rate of mass increase indicating the evaluation of moisture resistance was 0.6%. In the gelation evaluation, even after left alone at room temperature for two weeks, the positive electrode mixture material paste did not gel. The mixing ratio among the components in the mixture, the characteristic values of the components, and heat treatment temperatures are shown in Table 1, and the evaluation results are shown in Table 2.

Example 2

A positive electrode active material was obtained and evaluated as in Example 1 except that 0.2 part by mass of hydroxyl-containing polydimethylsiloxane, 0.1 part by mass of propylene glycol, 0.2 part by mass of the fine carbon particles from the dispersion liquid, 0.02 part by mass of the polycarboxylic acid polymeric dispersant, and 4.9 parts by mass of 2-propanol were added to prepare a mixture. The viscosity of the mixture was 560 mPa·S.

The initial discharge capacity of the obtained positive electrode active material was 201 mAh/g, and the positive electrode resistance thereof was 1.2. The pH indicating the evaluation of water resistance was 10.3; the conductivity was 120 μS/cm; and the rate of mass increase indicating the evaluation of moisture resistance was 0.7%. In the gelation evaluation, even after left alone at room temperature for two weeks, the positive electrode mixture material paste did not gel. The mixing ratio among the components, the characteristic values thereof, and the like are shown in Table 1, and the evaluation results are shown in Table 2.

Example 3

A positive electrode active material was obtained and evaluated as in Example 1 except that 0.2 part by mass of hydroxyl-containing polydimethylsiloxane of another type (KPN3504 available from Shin-Etsu Chemical Co., Ltd), 0.1 part by mass of propylene glycol, 0.2 part by mass of the fine carbon particles from the dispersion liquid, 0.02 part by mass of the polycarboxylic acid polymeric dispersant, and 4.9 parts by mass of 2-propanol were added to prepare a mixture. The viscosity of the mixture was 610 mPa·S.

The initial discharge capacity of the obtained positive electrode active material was 198 mAh/g, and the positive electrode resistance thereof was 1.2. The pH indicating the evaluation of water resistance was 10.1; the conductivity was 90 μS/cm; and the rate of mass increase indicating the evaluation of moisture resistance was 0.6%. In the gelation evaluation, even after left alone at room temperature for two weeks, the positive electrode mixture material paste did not gel. The mixing ratio among the components, the characteristic values thereof, and the like are shown in Table 1, and the evaluation results are shown in Table 2.

Example 4

A positive electrode active material was obtained and evaluated as in Example 1 except that propylene glycol was not added. The viscosity of the mixture was 560 mPa·S.

The initial discharge capacity of the obtained positive electrode active material was 192 mAh/g, and the positive electrode resistance thereof was 1.7. The pH indicating the evaluation of water resistance was 10.3; the conductivity was 110 μS/cm; and the rate of mass increase indicating the evaluation of moisture resistance was 0.7%. In the gelation evaluation, even after left alone at room temperature for two weeks, the positive electrode mixture material paste did not gel. The mixing ratio among the components and mixing conditions are shown in Table 1, and the evaluation results are shown in Table 2.

Example 5

A positive electrode active material was obtained and evaluated as in Example 1 except that heat treatment was performed in a vacuum atmosphere at 250° C.

The initial discharge capacity of the obtained positive electrode active material was 199 mAh/g, and the positive electrode resistance thereof was 1.3. The pH indicating the evaluation of water resistance was 9.7; the conductivity was 80 μS/cm; and the rate of mass increase indicating the evaluation of moisture resistance was 0.6%. In the gelation evaluation, even after left alone at room temperature for two weeks, the positive electrode mixture material paste did not gel. The mixing ratio among the components and mixing conditions are shown in Table 1, and the evaluation results are shown in Table 2.

Example 6

A positive electrode active material was obtained and evaluated as in Example 1 except that 2 parts by mass of the fine carbon particles and 0.2 part by mass of the polycarboxylic acid polymeric dispersant were added to prepare a mixture. The viscosity of the mixture was 590 mPa·S.

The initial discharge capacity of the obtained positive electrode active material was 199 mAh/g, and the positive electrode resistance thereof was 1.2. The pH indicating the evaluation of water resistance was 9.8; the conductivity was 100 μS/cm; and the rate of mass increase indicating the evaluation of moisture resistance was 0.6%. In the gelation evaluation, even after left alone at room temperature for two weeks, the positive electrode mixture material paste did not gel. The mixing ratio among the components and mixing conditions are shown in Table 1, and the evaluation results are shown in Table 2.

Example 7

A positive electrode active material was obtained and evaluated as in Example 1 except that 0.2 part by mass of hexylene glycol (special grade chemical available from Kanto Chemical Co., Inc.) in place of propylene glycol was added to prepare a mixture. The viscosity of the mixture was 780 mPa·S.

The initial discharge capacity of the obtained positive electrode active material was 195 mAh/g, and the positive electrode resistance thereof was 1.6. The pH indicating the evaluation of water resistance was 10.1; the conductivity was 120 μS/cm; and the rate of mass increase indicating the evaluation of moisture resistance was 0.8%. In the gelation evaluation, even after left alone at room temperature for two weeks, the positive electrode mixture material paste did not gel. The mixing ratio among the components and mixing conditions are shown in Table 1, and the evaluation results are shown in Table 2.

Comparative Example 1

The lithium-nickel composite oxide powder obtained in Example 1 was evaluated as a positive electrode active material without treating it.

The initial discharge capacity of the positive electrode active material was 203 mAh/g, and the positive electrode resistance thereof was 1 (reference value). The pH indicating the evaluation of water resistance was 11.1; the conductivity was 420 µS/cm; and the rate of mass increase indicating the evaluation of moisture resistance was 1.9%. In the gel evaluation, after left alone at room temperature for two weeks, the positive electrode mixture material paste was confirmed to have gelled. The mixing ratio among the components and mixing conditions are shown in Table 1, and the evaluation results are shown in Table 2.

Comparative Example 2

A positive electrode active material was obtained and evaluated as in Example 1 except that hydroxyl-containing polydimethylsiloxane, propylene glycol, or polycarboxylic acid polymeric dispersant was not added; and 10 parts by mass of 2-propanol and 0.5 part by mass of the fine carbon particles were added and dried while mixing using a spatula at 80° C. The viscosity of the mixture could not be measured, since the mixture was dried while mixing it.

The initial discharge capacity of the obtained positive electrode active material was 187 mAh/g, and the positive electrode resistance thereof was 1.9. The pH indicating the evaluation of water resistance was 10.8; the conductivity was 360 µS/cm; and the rate of mass increase indicating the evaluation of moisture resistance was 1.2%. In the gel evaluation, after left alone at room temperature for two weeks, the positive electrode mixture material paste was confirmed to have gelled. The mixing ratio among the components and mixing conditions are shown in Table 1, and the evaluation results are shown in Table 2.

Comparative Example 3

A positive electrode active material was obtained and evaluated as in Example 1 except that hydroxyl-containing polydimethylsiloxane, propylene glycol, or polycarboxylic acid polymeric dispersant was not added; and 10 parts by mass of 2-propanol and 0.5 part by mass of the fine carbon particles were added, charged into a ball mill, and mixed at 150 rpm for 10 minutes. The viscosity of the mixture was 80 mPa·S.

The initial discharge capacity of the obtained positive electrode active material was 163 mAh/g, and the positive electrode resistance thereof was 5.1. The pH indicating the evaluation of water resistance was 11.3; the conductivity was 400 µS/cm; and the rate of mass increase indicating the evaluation of moisture resistance was 2.5%. In the gel evaluation, after left alone at room temperature for two weeks, the positive electrode mixture material paste was confirmed to have gelled. The mixing ratio among the components and mixing conditions are shown in Table 1, and the evaluation results are shown in Table 2.

Comparative Example 4

A positive electrode active material was obtained and evaluated as in Example 1 except that 10 parts by mass of 2-propanol was added, and mixed and dried at 80° C. simultaneously while adding 3 g of a water dispersion of pH 8.2 containing 1% by mass of carbon nanotubes (average diameter 10 nm, average length 5 µm) by spray using a spatula. The viscosity of the mixture could not be measured, since the mixture was dried while mixing it.

The initial discharge capacity of the obtained positive electrode active material was 184 mAh/g, and the positive electrode resistance thereof was 2.2. The pH indicating the evaluation of water resistance was 10.7; the conductivity was 380 µS/cm; and the rate of mass increase indicating the evaluation of moisture resistance was 1.4%. In the gel evaluation, after left alone at room temperature for two weeks, the positive electrode mixture material paste was confirmed to have gelled. The mixing ratio among the components and mixing conditions are shown in Table 1, and the evaluation results are shown in Table 2.

Comparative Example 5

A positive electrode active material was obtained and evaluated as in Example 1 except that propylene glycol, fine carbon particles, or polycarboxylic acid polymeric dispersant was not added; and 0.5 part by mass of TEOS (tetraethyl orthosilicate available from Kanto Chemical Co., Inc.) in place of the hydrophobic coat forming agent was added and dried while mixing using a spatula at 80° C. The viscosity of the mixture could not be measured, since the mixture was dried while mixing it.

The initial discharge capacity of the obtained positive electrode active material was 169 mAh/g, and the positive electrode resistance thereof was 4.3. The pH indicating the evaluation of water resistance was 10.5; the conductivity was 310 µS/cm; and the rate of mass increase indicating the evaluation of moisture resistance was 1.4%. In the gel evaluation, after left alone at room temperature for two weeks, the positive electrode mixture material paste did not gel. The mixing ratio among the components and mixing conditions are shown in Table 1, and the evaluation results are shown in Table 2.

TABLE 1

| | Active material | Carbon | | Disperant | Cost forming agent | | |
| | Li—Ni | | | Polycarboxylic | Siloxane | Siloxane | Silicate |
| Example | composite oxide Mass parts | Fine particles Mass parts | Nanotube Mass parts | acid polymer Mass parts | PRX413 Mass parts | KPN3504 Mass parts | TEOS Mass parts |
|---|---|---|---|---|---|---|---|
| Example 1 | 100 | 0.5 | — | 0.05 | 0.5 | — | — |
| Example 2 | 100 | 0.2 | — | 0.02 | 0.2 | — | — |
| Example 3 | 100 | 0.2 | — | 0.02 | — | 0.2 | — |
| Example 4 | 100 | 0.5 | — | 0.05 | 0.5 | — | — |
| Example 5 | 100 | 0.5 | — | 0.05 | 0.5 | — | — |
| Example 6 | 100 | 2 | — | 0.2 | 0.5 | — | — |
| Example 7 | 100 | 0.5 | — | 0.05 | 0.5 | — | — |

TABLE 1-continued

| | | | | | | | |
|---|---|---|---|---|---|---|---|
| Comparative Example 1 | 100 | — | — | — | — | — | — |
| Comparative Example 2 | 100 | 0.5 | — | — | — | — | — |
| Comparative Example 3 | 100 | 0.5 | — | — | — | — | — |
| Comparative Example 4 | 100 | — | 0.015 | — | — | — | — |
| Comparative Example 5 | 100 | — | — | — | — | — | 0.5 |

| | Organic solvent | | | Mixture | | |
|---|---|---|---|---|---|---|
| Example | 2-propanol Mass parts | Propylene glycol Mass parts | Hexylene glycol Mass parts | Viscosity mPa·S | Carbon average particles diameter nm | Heat treatment °C. |
| Example 1 | 9.8 | 0.2 | — | 710 | 45 | 150 |
| Example 2 | 8.9 | 0.1 | — | 660 | 65 | 150 |
| Example 3 | 9.9 | 0.1 | — | 610 | 65 | 150 |
| Example 4 | 9.8 | — | — | 560 | 45 | 150 |
| Example 5 | 9.8 | 0.2 | — | 710 | 45 | 250 |
| Example 6 | 9.8 | 0.2 | — | 590 | 80 | 150 |
| Example 7 | 9.8 | — | 0.2 | 780 | 45 | 180 |
| Comparative Example 1 | — | — | — | — | — | — |
| Comparative Example 2 | 10 | — | — | — | Aggregation | 150 |
| Comparative Example 3 | 10 | — | — | 80 | Aggregation | 150 |
| Comparative Example 4 | 10 | — | — | — | Aggregation | 150 |
| Comparative Example 5 | — | — | — | — | — | 150 |

TABLE 2

| | Positive electrode active material | | | | | |
|---|---|---|---|---|---|---|
| | Initial discharge | Positive electrode | Water resistance | | Moisture resistance | |
| Example | capacity mAh/g | resistance — | pH | Conductivity μS/cm | evaluation % | Gelation evaluation |
| Example 1 | 197 | 1.4 | 9.6 | 70 | 0.6 | ○ |
| Example 2 | 201 | 1.2 | 10.3 | 120 | 0.7 | ○ |
| Example 3 | 198 | 1.2 | 10.1 | 90 | 0.6 | ○ |
| Example 4 | 192 | 1.7 | 10.3 | 110 | 0.7 | ○ |
| Example 5 | 199 | 1.3 | 9.7 | 80 | 0.6 | ○ |
| Example 6 | 199 | 1.2 | 9.8 | 100 | 0.6 | ○ |
| Example 7 | 195 | 1.6 | 10.1 | 120 | 0.8 | ○ |
| Comparative Example 1 | 203 | 1.0 | 11.1 | 420 | 1.9 | X |
| Comparative Example 2 | 187 | 1.9 | 10.8 | 360 | 1.2 | X |
| Comparative Example 3 | 163 | 5.1 | 11.3 | 400 | 2.5 | X |
| Comparative Example 4 | 184 | 2.2 | 10.7 | 380 | 1.4 | X |
| Comparative Example 5 | 169 | 4.3 | 10.5 | 310 | 1.4 | ○ |

According to the present invention, there is obtained a positive electrode active material for nonaqueous electrolyte secondary batteries which has a high capacity and a high output and whose positive electrode mixture material paste does not gel even when left alone at room temperature for a long time. Such a positive electrode active material is suitable for car-mounted nonaqueous electrolyte secondary batteries that are required to have a high capacity and a high output, as well as high productivity. An obtained nonaqueous electrolyte secondary battery can be suitably used as a power supply for a motor (electric motor) mounted on a vehicle such as a car including an electric motor, such as a hybrid car, an electric car, or a fuel cell car.

DESCRIPTION OF REFERENCE SIGNS

1: coin-type battery
2: case
2a: positive electrode can
2b: negative electrode can
2c: gasket
3: electrode
3a: positive electrode
3b: negative electrode
3c: separator

The invention claimed is:

1. A method for producing a positive electrode active material comprising: positive electrode active material particles each serving as a core; and a coating layer on each of the positive electrode active material particles, the coating layer comprising fine carbon particles of average particle diameter of 10 to 100 nm, an organic dispersant, and a hydrophobic coat forming agent, the method comprising:
 a mixing step of preparing a mixture comprising the fine carbon particles, the organic dispersant, the hydrophobic coat forming agent, the organic solvent, and the positive electrode active material particles;
 a drying step of drying the mixture to obtain the mixture containing the organic solvent in a reduced amount; and
 a heat treatment step of heat-treating the mixture containing the organic solvent in the reduced amount to obtain the positive electrode active material having the coating layer comprising at least the fine carbon particles, the organic dispersant, and the hydrophobic coat forming agent,
 wherein the fine carbon particles are dispersed in the coating layer,
 wherein the hydrophobic coat forming agent is prepared using hydroxyl-containing polydimethylsiloxane, and
 wherein the organic dispersant contains a polycarboxylic acid polymeric dispersant.

2. The method for producing a positive electrode active material for nonaqueous electrolyte secondary batteries of claim 1, wherein the mixing step comprises previously mixing the fine carbon particles, the organic dispersant, the hydrophobic coat forming agent, and at least part of the organic solvent to obtain a carbon-containing composition (1) and then mixing the carbon-containing composition (1) and other components to prepare the mixture.

3. The method for producing a positive electrode active material for nonaqueous electrolyte secondary batteries of claim 1, wherein the mixing step comprises previously mixing the fine carbon particles, the organic dispersant, and at least part of the organic solvent to obtain a carbon-containing composition (2) and then mixing the carbon-containing composition (2) and other components to prepare the mixture.

4. The method for producing a positive electrode active material for nonaqueous electrolyte secondary batteries of claim 1, wherein the mixing step comprises preparing the mixture in such a manner that an average particle diameter of the fine carbon particles in the mixture is 10 to 100 nm.

5. The method for producing a positive electrode active material for nonaqueous electrolyte secondary batteries of claim 1, wherein the organic solvent in the mixture is a solvent obtained by mixing at least one selected from lower alcohols consisting of 2-propanol and ethanol and at least one selected from glycols consisting of ethylene glycol, propylene glycol, and hexylene glycol.

6. The method for producing a positive electrode active material for nonaqueous electrolyte secondary batteries of claim 1, wherein the mixing step comprises adjusting viscosity of the mixture so that the viscosity is in a range of 100 to 10000 mPa·s.

7. The method for producing a positive electrode active material for nonaqueous electrolyte secondary batteries of claim 1, wherein the mixing step comprises preparing the mixture using a rotation-revolution kneading mixer.

8. The method for producing a positive electrode active material for nonaqueous electrolyte secondary batteries of claim 1, wherein the heat treatment step comprises controlling a heat treatment temperature to a range of 80 to 400° C. in an atmosphere selected from an oxygen-containing atmosphere, an inert atmosphere, and a vacuum atmosphere.

9. A positive electrode active material for nonaqueous electrolyte secondary batteries, the positive electrode active material comprising:
 positive electrode active material particles each serving as a core, and
 a coating layer on each of the positive electrode active material particles,
 wherein the coating layer comprises
  fine carbon particles of average particle diameter of 10 to 100 nm,
  an organic dispersant, and
  a hydrophobic coat forming agent,
 wherein the fine carbon particles are dispersed in the coating layer,
 wherein the hydrophobic coat forming agent is prepared using hydroxyl-containing polydimethylsiloxane, and
 wherein the organic dispersant contains a polycarboxylic acid polymeric dispersant.

10. The positive electrode active material for nonaqueous electrolyte secondary batteries of claim 9, wherein the positive electrode active material particles are formed of one or more selected from the group consisting of a lithium-nickel composite oxide, a lithium-cobalt composite oxide, a lithium-nickel-cobalt-manganese composite oxide, and a lithium-manganese composite oxide.

11. The positive electrode active material for nonaqueous electrolyte secondary batteries of claim 9, wherein if 1 g of the positive electrode active material for nonaqueous electrolyte secondary batteries is added to 50 ml of pure water of 24° C. to prepare slurry and then the slurry is left alone for 60 minutes, then pH of the slurry at 24° C. is 11 or less, and then conductivity thereof is 200 μS/cm or less, and
 if the positive electrode active material is exposed to a thermohygrostat having a temperature of 30° C. and a humidity of 70% RH for six days, the rate of increase of a mass of the positive electrode active material after exposure with respect to the mass thereof before the exposure is 1.0% or less.

12. The positive electrode active material for nonaqueous electrolyte secondary batteries of claim 9, wherein the positive electrode active material particles represented by the following general formula (1):

$Li_aNi_{1-b}M_bO_2$  General Formula (1)

where M represents at least one element selected from transition metal elements other than Ni, Group 2 elements, and Group 13 elements; $1.00 \leq a \leq 1.10$, and $0.01 \leq b \leq 0.5$.

13. The positive electrode active material for nonaqueous electrolyte secondary batteries of claim 9, wherein the positive electrode active material particles represented by the following general formula (2):

$Li_tNi_{1-x-y}Co_xM_yO_2$  General Formula (2)

where M represents at least one element selected from the group consisting of Mg, Al, Ca, Ti, V, Cr, Mn, Zr, Nb, Mo, and W; $0.95 \leq t \leq 1.20$; $0 \leq x \leq 0.22$; and $0 \leq y \leq 0.1$.

14. The positive electrode active material for nonaqueous electrolyte secondary batteries of claim 9, wherein the content of the hydrophobic coat forming agent is 0.1 to 5 parts by mass of the positive electrode active material particles serving as the core.

15. A nonaqueous electrolyte secondary battery comprising:
- a positive electrode comprising a positive electrode active material and a conductive material;
- a negative electrode comprising a negative electrode active material;
- a separator; and
- a nonaqueous electrolyte, wherein
- the positive electrode active material for nonaqueous electrolyte secondary batteries of claim 9 is used as the positive electrode active material.

\* \* \* \* \*